United States Patent Office 2,938,802
Patented May 31, 1960

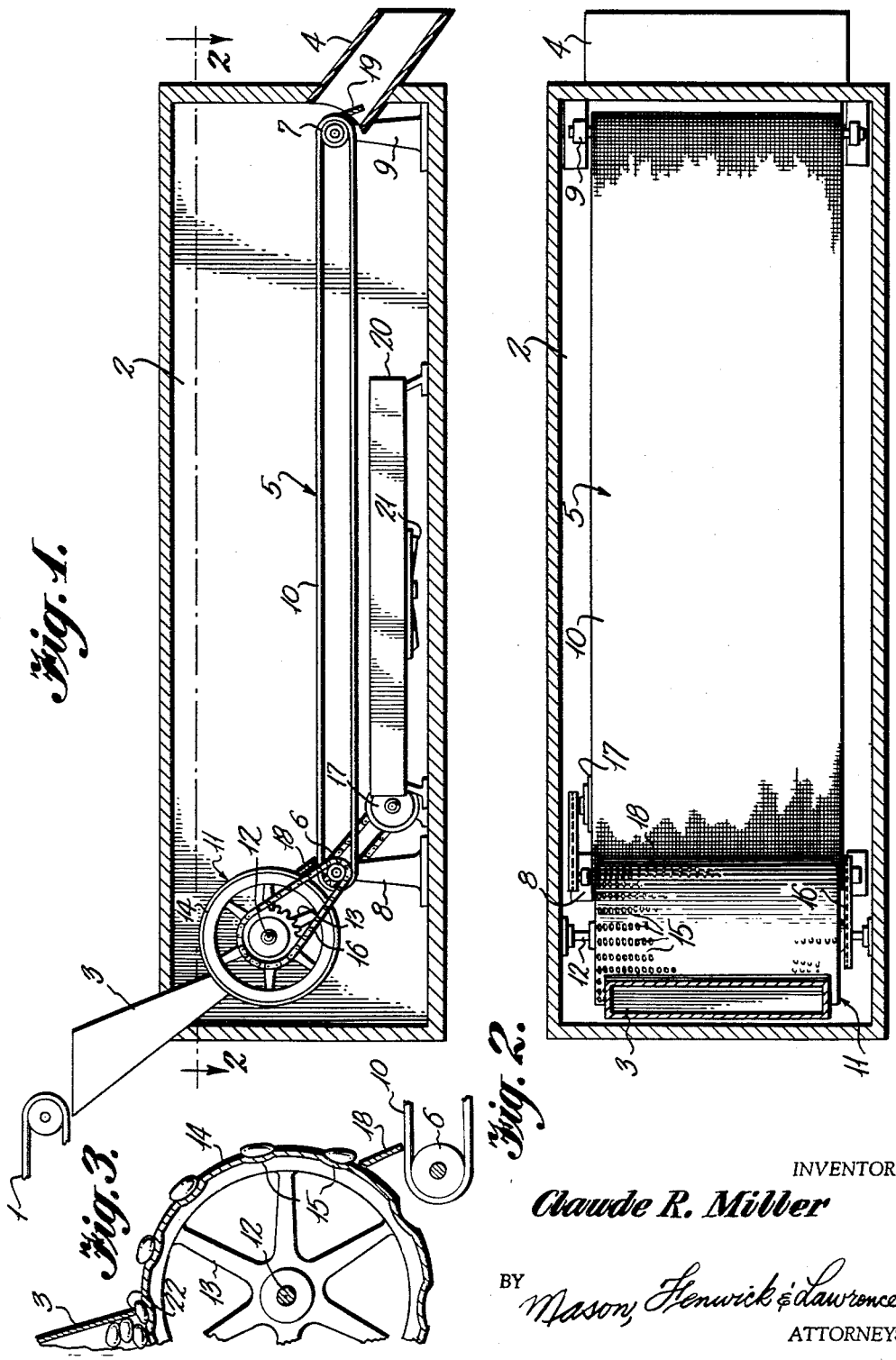

2,938,802

METHOD OF PREPARING COOKED FROZEN RICE

Claude R. Miller, Gulf States Bldg., Dallas, Tex.

Filed Jan. 8, 1957, Ser. No. 633,088

2 Claims. (Cl. 99—193)

This invention relates to a method of freezing food products, particularly food products having small grain or unit size and ordinarily packed in bulk, such as rice, corn, peas and the like, and to apparatus by which the method can be carried out.

Since the introduction of frozen food products on the commercial market, it has been realized that packages of small grain or unit size foods with the individual units or grains separated so that the product is free flowing has many advantages over the customary solid block type pack. Small quantities can be removed from the package with ease without the necessity of thawing the entire contents of the package. Thawing time is greatly reduced, as the contents of a package may be spread out and there is no large mass to be thawed. Some attempts have been made to produce a free flowing pack, but the processes proposed have been complicated and expensive.

The object of the present invention is to provide a method of freezing foods which will result in separate freezing of individual food units without adherence of the units to one another.

Another object of the invention is to provide a method of freezing foods whereby the processed foods will be ready for consumption upon thawing.

A more specific object of the invention is to provide a method whereby individual grains or units of food will be maintained separated until hard frozen so that there will be no tendency of the units to adhere when brought together.

Yet another object is to provide apparatus which will separate individual units of food from one another prior to freezing and hold them separated during the freezing stage of the process.

Other objects of the invention will become apparent from the following description of one practical embodiment thereof, when taken in conjunction with the drawings which accompany, and form part of, this specification.

In the drawings:

Figure 1 is a vertical section, somewhat schematic, through a freezing chamber, showing apparatus suitable for carrying out the method of the present invention;

Figure 2 is a horizontal section through the apparatus shown in Figure 1 and is taken on the line 2—2 of Figure 1; and, Figure 3 is an enlarged fragmentary section through a portion of a transfer drum, for transporting the food product from an inlet chute to a freezing belt, and mechanism associated therewith.

The present method has been worked out particularly for freezing whole grained rice, but is equally efficient for other whole grained cereals, or in fact, for any food product having small unit size where it is desirable for the packaged product to be free flowing.

In carrying out the method, the rice or other product is cooked by any conventional method until it is ready to serve and eat. The cooked product is then permitted to cool. In many instances it will be desirable to chill the product until it reaches a temperature which is just slightly above the freezing point. Experiments have shown that good results are obtained if the product is chilled to approximately 33° F. This prechilling of the product results in removing most of the surface moisture that may be present after cooking, and at the same time permits quicker freezing. Before freezing takes place the individual grains of the food product are separated and maintained out of contact with one another during the freezing part of the process. The product is then frozen solid. Any appropriate freezing temperature may be used but good results have been obtained by subjecting the product to a moving air mass of approximately −20° F. After the separate grains are solidly frozen, they can be brought together in a mass and packed in any desired manner. It is, of course, necessary to maintain the product in a frozen condition until used.

This process results in a frozen product in which each of the grains is separate and the product will be free flowing. Thus, any quantity may be removed from a package as desired, without first thawing the contents, and the portion not being used can be kept in a freezer until a later date. As there is no adherence between the grains, the quantity which has been taken from the package can be spread out and will thaw very quickly. It is well known that small frozen particles thaw much more quickly than a large frozen mass. As the product is completely cooked it can be served as soon as thawed, or it can be heated if desired.

The process lends itself ideally to continuous operation and freezing can be done in a single stage without the necessity for glazing, agitation, or other means to prevent adherence of the separate particles during the freezing operation. Apparatus for carrying out the method as a continuous process has been shown in the drawings.

The product may be cooked in any of the kettles common to commercial processing of food products and carried to the apparatus disclosed by means of a belt 1. The belt may carry the product through a cooling chamber to chill it if desired. The drawings show an insulated freezing compartment 2 having an inlet chute 3 at one end and an outlet chute 4 at the other end. A conveyor 5 carries the product through the freezing chamber. The conveyor consists in rollers 6 and 7 positioned, respectively, near the inlet and outlet ends of the freezing chamber upon suitable standards 8 and 9. An endless mesh belt 10 is trained about the rollers and its top flight forms a surface upon which the product may be carried. A mesh belt is used to permit free circulation of the refrigerated air so that all portions of the product may be in contact with the air.

Intermediate the inlet chute 3 and the end of the belt supported upon roller 6, a suitable transfer mechanism 11 is mounted. This may take the form of a drum mounted for rotation upon a shaft 12. The drum will be formed of suitable spiders 13 mounted upon shaft 12 and spaced apart with the surface of the drum being formed from a sheet of metal 14 wrapped around and secured to the spiders. The surface of the drum is indented to form a plurality of spaced pockets 15 of proper size and shape to receive grains of the product being processed. It will be understood that different drums will be used for different products. The pockets 15 are very shallow and serve simply to seat the grains while leaving the major portion of the grain projecting above the surface of the drum. The drum and roller 6 may be coupled together by a suitable sprocket and chain drive 16 so that the drum and belt 10 will move at substantially the same surface speed. The belt and drum may be driven from a suitable motor 17.

A scraper blade 18 is mounted in the standards 8 and has its edge in surface engagement with the drum. The blade is of sufficient length to extend completely across the drum. As the drum is within the freezing chamber, the grains which it carries may become adhered to the surface of the drum and the scraper 18 serves to free them so that they will fall upon the upper flight of the conveyor belt 10. A similar blade 19 is mounted in the standards 9 and has its edge in surface contact with the belt as it moves around the roller 7 so that the grains will be freed from the belt and fall into the outlet chute 4.

In the bottom of the freezing conveyor any appropriate refrigerating apparatus 20 may be mounted. A fan 21 will be employed to create a circulation of air across the coils of the refrigerating unit, through the belt 10 and around the product being carried thereon.

The precooked and chilled product will be conveyed by belt 1 and dumped into the inlet chute 3 of the freezing compartment. The product will drop down the chute into contact with the surface of the transfer drum 11. The forward edge 22 of the chute 3 will serve as a baffle to prevent grains of the product which are not seated in the pockets of the drum from moving out of the chute. Those grains which are seated in the pockets will move freely onto the edge of the chute and be carried into the freezing compartment. By maintaining a constant supply in the chute, substantially all of the pockets will be filled as the drum rotates. While the product is on the drum but a very brief time, the low temperature maintained within the compartment may be sufficient to cause the product to stick to the drum. As the grains reach a point near the belt 10, scraper 18 will loosen them from the surface of the drum so that they will fall upon the surface of the belt 10 in substantially the spaced relation which they occupied on the drum. Thus, the drum serves as a means for transferring the grains from the inlet chute to the conveyor, and, at the same time, a means for separating the individual grains so that they are out of contact with one another. By this means the grains can be moved completely through the freezing compartment and frozen solid while out of contact. When the grains reach the far end of the compartment they will be scraped from the belt by the scraper 19 and fall into the outlet chute 4. The outlet chute may empty upon a conveyor which carries the grains to a packaging machine or directly into a packaging machine. It will be obvious from a study of the apparatus disclosed that large quantities of the product can be moved continuously through the freezing chamber and will be supplied at a uniform rate to the packaging machinery.

While in the above one practical embodiment of the invention has been disclosed, it will be understood that the specific details of structure as shown in the drawings and described herein are merely for purposes of illustration and the apparatus may take other forms within the scope of the appended claims.

What is claimed is:

1. A method of preparing cooked rice in which the starch has been broken down into a gelatinous mass having a fluffy surface and the rice units en masse cohere to each other comprising the steps of, chilling the mass of cohering cooked rice units, sequentially stripping rice units uncoheringly from said mass, arranging each of the rice units in spaced apart order on a support so that each rice unit will be wholly out of contact with adjacent rice units, placing said rice units in heat exchange relation with a freezing medium, maintaining said rice units in said spaced apart relationship until they are frozen, removing said rice units from said support and recombining said frozen rice units into a pourable granular mass.

2. In a method of preparing cooked rice as claimed in claim 1, the chilling of the mass of rice units being continued until said rice units have reached a temperature of approximately 33° F., and the temperature of said freezing medium being maintained at approximately —20° F.

References Cited in the file of this patent

UNITED STATES PATENTS

| | | |
|---|---|---|
| 2,182,556 | Griswold | Dec. 5, 1939 |
| 2,223,972 | Sterling | Dec. 3, 1940 |
| 2,229,000 | Birdseye | Jan. 14, 1941 |
| 2,286,225 | Noyes | June 16, 1942 |
| 2,300,229 | Knowles | Oct. 27, 1942 |
| 2,364,049 | Bensel | Dec. 5, 1944 |
| 2,385,140 | Knowles | Sept. 18, 1945 |
| 2,424,870 | Welling | July 29, 1947 |

OTHER REFERENCES

"Quick Frozen Foods" (February 1948, page 84).